(12) United States Patent
Rane et al.

(10) Patent No.: US 9,438,412 B2
(45) Date of Patent: Sep. 6, 2016

(54) COMPUTER-IMPLEMENTED SYSTEM AND METHOD FOR MULTI-PARTY DATA FUNCTION COMPUTING USING DISCRIMINATIVE DIMENSIONALITY-REDUCING MAPPINGS

(71) Applicant: Palo Alto Research Center Incorporated, Palo Alto, CA (US)

(72) Inventors: Shantanu Rane, Menlo Park, CA (US); Julien Freudiger, Mountain View, CA (US); Alejandro E. Brito, Mountian View, CA (US); Ersin Uzun, Campbell, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 14/581,918

(22) Filed: Dec. 23, 2014

(65) Prior Publication Data

US 2016/0182222 A1 Jun. 23, 2016

(51) Int. Cl.
*H04L 29/06* (2006.01)
*H04L 9/00* (2006.01)

(52) U.S. Cl.
CPC ........... *H04L 9/008* (2013.01); *H04L 63/0428* (2013.01); *H04L 2209/24* (2013.01)

(58) Field of Classification Search
CPC H04L 9/008; H04L 63/0428; H04L 2209/24
USPC .................... 713/168, 150, 167; 726/4, 2, 22
See application file for complete search history.

(56) References Cited

U.S. PATENT DOCUMENTS

| | | | | |
|---|---|---|---|---|
| 4,691,277 A | * | 9/1987 | Kronstadt | G06F 9/3806 711/213 |
| 5,142,634 A | * | 8/1992 | Fite | G06F 9/3844 712/237 |
| 5,237,666 A | * | 8/1993 | Suzuki | G06F 9/30021 712/240 |

(Continued)

OTHER PUBLICATIONS

Shaneck, Mark, Yongdae Kim, and Vipin Kumar. "Privacy preserving nearest neighbor search." Machine Learning in Cyber Trust. Springer US, 2009. 247-276.*

(Continued)

*Primary Examiner* — David García Cervetti
(74) *Attorney, Agent, or Firm* — Patrick J. S. Inouye; Leonid Kisselev

(57) ABSTRACT

Computational overhead for private multiparty data function computation can be decreased by sharing parameters of dimensionality-reducing function between a client and a server, with both the client applying the function to a query vectors and the server applying the function to server vectors, both client and server creating embedded vectors. The client homomorphically encrypts the embedded query vector and provides the encrypted embedded query vector to the server. The server performs encrypted domain computations for an embedded vector processing function, each computation using the encrypted embedded query vector and one of the server embedded vectors as inputs for the function. The client receives encrypted computation results and identifies server vectors of interest using those results that are informative of a result of an application of an aggregate function to the query vector and one of the server vectors. The client obtains the vectors of interest using an oblivious transfer protocol.

18 Claims, 4 Drawing Sheets

(56) References Cited

U.S. PATENT DOCUMENTS

| | | | | |
|---|---|---|---|---|
| 5,732,254 | A * | 3/1998 | Tanimoto | G06F 9/3861 712/240 |
| 6,035,057 | A * | 3/2000 | Hoffman | G01S 7/12 382/155 |
| 6,122,628 | A * | 9/2000 | Castelli | G06F 17/30333 |
| 6,530,016 | B1 * | 3/2003 | Ukai | G06F 9/30054 712/237 |
| 6,920,453 | B2 * | 7/2005 | Mannila | G06F 17/15 |
| 7,975,150 | B1 * | 7/2011 | Lillibridge | G06F 17/30867 380/277 |
| 8,594,329 | B2 * | 11/2013 | Vaikuntanathan | H04L 9/00 380/255 |
| 8,837,727 | B2 * | 9/2014 | Boufounos | H04K 1/00 380/255 |
| 8,935,781 | B1 * | 1/2015 | Muth | G06F 21/74 726/22 |
| 8,972,742 | B2 * | 3/2015 | Troncoso Pastoriza | G06K 9/00288 380/28 |
| 9,009,089 | B1 * | 4/2015 | El Defrawy | G06F 21/602 706/18 |
| 9,031,229 | B1 * | 5/2015 | Nita | H04L 9/008 380/28 |
| 9,043,927 | B2 * | 5/2015 | Hu | H04W 12/06 726/26 |
| 9,129,062 | B1 * | 9/2015 | Adams | G06F 11/3644 |
| 9,171,173 | B1 * | 10/2015 | Rogers | G06F 21/60 |
| 9,213,551 | B2 * | 12/2015 | Shah | G06F 9/3851 |
| 2003/0002731 | A1 * | 1/2003 | Wersing | G06K 9/4628 382/161 |
| 2004/0107194 | A1 * | 6/2004 | Thorpe | G06F 17/30651 |
| 2004/0107221 | A1 * | 6/2004 | Trepess | G06F 17/30651 |
| 2004/0117367 | A1 * | 6/2004 | Smith | G06F 17/30265 |
| 2004/0133777 | A1 * | 7/2004 | Kiriansky | G06F 21/554 713/166 |
| 2004/0243816 | A1 * | 12/2004 | Hacigumus | G06F 17/30471 713/193 |
| 2005/0004910 | A1 * | 1/2005 | Trepess | G06F 17/30038 |
| 2005/0004949 | A1 * | 1/2005 | Trepess | G06F 17/3089 |
| 2005/0010804 | A1 * | 1/2005 | Bruening | G06F 21/52 726/1 |
| 2005/0027678 | A1 * | 2/2005 | Aono | G06F 17/30631 |
| 2005/0108562 | A1 * | 5/2005 | Khazan | G06F 11/3604 726/23 |
| 2005/0198645 | A1 * | 9/2005 | Marr | G06F 21/606 719/310 |
| 2005/0257033 | A1 * | 11/2005 | Elias | G06F 9/30058 712/236 |
| 2006/0095852 | A1 * | 5/2006 | Trepess | G01F 17/3071 715/741 |
| 2006/0294346 | A1 * | 12/2006 | Stempel | G06F 9/3806 712/242 |
| 2007/0067281 | A1 * | 3/2007 | Matveeva | G06F 17/30675 |
| 2007/0113291 | A1 * | 5/2007 | Dai | G06F 21/629 726/27 |
| 2008/0256346 | A1 * | 10/2008 | Lee | G06F 9/322 712/239 |
| 2009/0028442 | A1 * | 1/2009 | Kimmel | G06K 9/00214 382/218 |
| 2009/0136033 | A1 * | 5/2009 | Sy | H04L 9/008 380/255 |
| 2009/0222646 | A1 * | 9/2009 | Ohba | G06F 11/3636 712/227 |
| 2010/0017870 | A1 * | 1/2010 | Kargupta | H04L 63/1408 726/14 |
| 2010/0246812 | A1 * | 9/2010 | Rane | H04L 9/302 380/28 |
| 2010/0303371 | A1 * | 12/2010 | Robinson | G06K 9/6232 382/254 |
| 2011/0099162 | A1 * | 4/2011 | Bradford | G06F 17/30324 707/723 |
| 2012/0045056 | A1 * | 2/2012 | Takashima | H04L 9/0836 380/255 |
| 2012/0075682 | A1 * | 3/2012 | Amoroso | B82Y 10/00 359/1 |
| 2012/0297201 | A1 * | 11/2012 | Matsuda | G06F 21/6245 713/189 |
| 2013/0114811 | A1 * | 5/2013 | Boufounos | H04K 1/00 380/255 |
| 2013/0160121 | A1 * | 6/2013 | Yazdani | G06F 21/54 726/23 |
| 2013/0318351 | A1 * | 11/2013 | Hirano | H04L 9/3073 713/168 |
| 2014/0185794 | A1 * | 7/2014 | Yasuda | H04L 9/008 380/28 |
| 2014/0185797 | A1 * | 7/2014 | Yasuda | H04L 9/008 380/44 |
| 2014/0359765 | A1 * | 12/2014 | Chen | G06F 21/51 726/22 |
| 2015/0007142 | A1 * | 1/2015 | Biffle | G06F 21/53 717/126 |
| 2015/0074027 | A1 * | 3/2015 | Huang | G06N 3/0454 706/25 |
| 2015/0095628 | A1 * | 4/2015 | Yamada | G06F 21/54 712/234 |
| 2015/0106588 | A1 * | 4/2015 | Godard | G06F 12/0893 711/221 |
| 2015/0213112 | A1 * | 7/2015 | Malewicz | G06F 17/30598 707/737 |
| 2015/0356294 | A1 * | 12/2015 | Tan | G06F 8/427 726/22 |
| 2015/0370560 | A1 * | 12/2015 | Tan | G06F 9/30058 717/148 |

OTHER PUBLICATIONS

Rabin, Michael O. "How to Exchange Secrets with Oblivious Transfer." IACR Cryptology ePdnt Archive 2005 (2005): 87.*

Qi, Yinian, and Mikhail J. Atallah. "Efficient privacy-preserving k-nearest neighbor search." Distributed Computing Systems, 2008. ICDCS'08. IEEE, 2008.*

Paillier, Pascal. "Public-key cryptosystems based on composite degree residuosity classes." Advances in cryptology—EUROCRYPT'99. Spdnger Berlin Heidelberg, 1999.*

Gentry, Craig. "Fully homomorphic encryption using ideal lattices." STOC. vol. 9. 2009.*

Datar M. Immorlica, N., Indyk, P., & Mirrokni, V. S. (Jun. 2004). Locality-sensitive lashing scheme based on p-stable distributions. In Proceedings of the twentieth annual symposium on Computational geometry (pp. 253-262). ACM.*

Boufounos, Petros, and Shantanu Rane. "Secure binary embeddings for privacy preserving nearest neighbors." Information Forensics and Security (WIFS), 2011 IEEE Interational Workshop on. IEEE, 2011.*

Achlioptas, Dimitris. "Database-friendly random projections: Johnson-Lindenstrauss with binary coins." Journal of computer and System Sciences 66.4 (2003): 671-687.*

Boufounos, Petros, and Shantanu Rane. "Secure binary embeddings for privacy preserving nearest neighbors." Information Forensics and Security (WIFS), 2011 IEEE International Workshop on. IEEE, 2011. Retrieved from https://www.merl.com/publications/docs/TR2011-077.pdf on May 4, 2016.

Datar, M., Immorlica, N., Indyk, P., & Mirrokni, V. S. (Jun. 2004). Locality-sensitive hashing scheme based on p-stable distributions. In Proceedings of the twentieth annual symposium on Computational geometry (pp. 253-262). ACM. Retrieved from http://www.cs.princeton.edu/courses/archive/spring05/cos598E/bib/p253-datar.pdf on May 4, 2016.

Shaneck, Mark, Yongdae Kim, and Vipin Kumar. "Privacy preserving nearest neighbor search." Machine Learning in Cyber Trust. Springer US, 2009. 247-276. Retrieved from http://www-users.cs.umn.edu/~shaneck/padm2006_fullpaper.pdf on May 4, 2016.

Qi, Yinian, and Mikhail J. Atallah. "Efficient privacy-preserving k-nearest neighbor search." Distributed Computing Systems, 2008. ICDCS'08. The 28th International Conference on IEEE, 2008. Retrieved from http://citeseerx.ist.psu.edu/viewdoc/download-?doi=10.1.1.183A190&rep=rep1&type=pdf on May 4, 2016.

Rabin, Michael O. "How to Exchange Secrets with Oblivious Transfer." IACR Cryptology ePrint Archive 2005 (2005): 187. Retrieved from https://eprint.iacr.org/2005/187.pdf on May 4, 2016.

Paillier, Pascal. "Public-key cryptosystems based on composite degree residuosity classes." Advances in cryptology—EUROCRYPT'99. Springer Berlin Heidelberg, 1999.

* cited by examiner

COMPUTER-IMPLEMENTED SYSTEM AND METHOD FOR MULTI-PARTY DATA FUNCTION COMPUTING USING DISCRIMINATIVE DIMENSIONALITY-REDUCING MAPPINGS

FIELD

This application relates in general to secure multi-party data exchange, and in particular, to a computer-implemented system and method for multi-party data function computing using discriminative dimensionality-reducing mappings.

BACKGROUND

Many key operations in data mining involve computation of aggregate functions of data held by multiple parties, with one party trying to find out an answer to a query based on the information held by the other party. For example, in a scenario involving two parties, such as a client and a server, the client may be trying to determine a distance between a query vector held by the client and a vector in the server's database, for purposes such as assessing a similarity between the client's vector and the server's vector. Similarly, the client may be trying to retrieve nearest neighbors of the query vector from the server's database. Likewise, the client may be interested in retrieving vectors from the server that have a large enough number of unique elements. All of these scenarios involve applying aggregate functions of multi-party data—functions that perform a computation on corresponding elements of the client's query vector and the server's vector and aggregate the result of the computation over the length of the query vector and the server's vector.

These aggregate functions become challenging to compute when privacy of the client's query and privacy of the server's data needs to be protected and current approaches to implementing the functions while preserving the privacy are inadequate. Conventionally, the preferred solution to this challenge is to encrypt the client's query vector using a homomorphic cryptosystem and to transmit the encrypted data to the server. The server then performs the aggregate function computation using the additively and possibly multiplicatively homomorphic properties of the cryptosystem and returns the encrypted result to the client. Only the client has the private decryption key for the cryptosystem, thus allowing only the client to decrypt the aggregate result. The server performs computations only using encrypted data and thus does not discover the client's query. The drawback of this approach is that significant computational overhead is incurred owing to the encryption and the decryption, as well as due to transmission, storage and computation of ciphertext data. Therefore, such encrypted-domain protocols are costly, require additional hardware resources, and reduce the speed with which the client obtains an answer to a query. Furthermore, such an approach compromises the privacy of the parties involved in the data exchange.

The following examples illustrate the disadvantages of using the encrypted domain protocol such as described above. The client's data is denoted by Xq and the server's data is denoted by Yi, where i=1, 2, . . . , N. Thus, in this scenario, the server has N items. The aggregate function is denoted by denoted by f(Xq, Yi). Using the homomorphic cryptosystems approach described above, the client can decrypt the result f(Xq, Yi) for each i. To illustrate why this approach compromises the privacy, consider an example in which f(Xq, Yi) is the distance between Xq and Yi. Now, suppose the goal of the protocol is to deliver to the client the K nearest neighbors of Xq, while preventing the server from knowing Xq, and preventing the client from knowing anything about the faraway Yi. However, if the above approach is followed, the client discovers the distance of Xq not just from the K nearest neighbors, but from each and every Yi. Thus, the server's privacy is compromised and the client learns how the server's data is distributed with respect to Xq.

Consider a second example in which f(Xq, Yi) takes value of 0 if Yi has at least as many unique elements as Xq, and takes value of 1 otherwise. Suppose the goal of the protocol is to deliver to the client those Yi for which f(Xq, Yi)=0, while preventing the server from discovering Xq, and preventing the client from knowing anything about those Yi for which f(Xq, Yi)=1. Encrypted domain protocols exist that operate on the histograms representing Xq and Yi, and return to the client the difference in the number of unique elements in Xq and Yi for all i. Thus, the client discovers not only which Yi's have at least as many unique elements as Xq, but also discovers the number of unique elements in each of the Yi's. Accordingly, the server's privacy is compromised and the client learns how the server's data is distributed with respect to Xq. The client receives more information than the client needs to answer the query, as the goal was to only deliver those Yi for which f(Xq, Yi)=0.

To protect the server's privacy, a special encrypted domain protocol has been used to prevent the client from learning the value of f(Xq, Yi), for those signals Yi which are not the nearest neighbors of Xq, such as described by Shaneck et al. "Privacy preserving nearest neighbor search," *Machine Learning in Cyber Trust*, Springer US, 2009. 247-276, and by Qi et al., "Efficient privacy-preserving k-nearest neighbor search," *The 28th IEEE International Conference on Distributed Computing Systems*, 2008. ICDCS '08, the disclosures of which are incorporated by reference. However, these encrypted domain protocols increase the ciphertext overhead, further compounding the speed and the hardware resources problems described above.

Other approaches have been implemented to attempt to reduce the computational burden of the special encrypted domain protocol. For example, Boufounos and Rane, "Secure binary embeddings for privacy preserving nearest neighbors," *IEEE International Workshop on Information Forensics and Security (WIFS)*, 2011, the disclosure of which is incorporated by reference, describes a way to conduct a two-party protocol in which a client initiates a query on a server's database to discover vectors in the server's database that are within a predefined distance from the query. The protocol utilizes a locality-sensitive hashing scheme with a specific property: the Hamming distances between hashes of query vectors and server vectors are proportional to the distance between the underlying vectors if the latter distance is below a threshold. The hashes do not provide information about the latter distance if the latter distance is above the threshold. While addressing some of the concerns associated with the solutions described above, the protocol nevertheless requires significant additional computational overhead due to the need to obtain the hashes using computations the encrypted domain.

Accordingly, there is a need for a way to compute functions of multi-party data while preserving privacy of the parties and while reducing computational overhead of the computation.

SUMMARY

Computational overhead for private multi-party data function computation can be decreased by sharing parameters of a discriminative dimensionality-reducing function between a client and a server, with the client applying the function to a query vector and the server to server vectors, both applications creating embedded vectors. The client homomorphically encrypts the embedded query vector and provides the encrypted embedded query vector to the server. The server performs encrypted domain computations for an embedded vector processing function, each computation using the encrypted embedded query vector and one of the server embedded vectors as inputs for the function. The client receives encrypted computation results and identifies server vectors of interest using those results that are informative of a result of an application of an aggregate function to the query vector and one of the server vectors. The client obtains the vectors of interest using an oblivious transfer protocol.

One embodiment provides a computer-implemented method for multi-party data function computing using discriminative dimensionality-reducing mappings. One or more vectors that include one or more elements drawn from a finite ordered set are maintained by a server. One or more parameters for a dimensionality-reducing mapping function and for an embedded vector processing function are obtained by the server. Embedded server vectors are created by the server by applying the mapping function to the server vectors, wherein each of the embedded server vectors has a lower dimensionality than the server vector on which that embedded server vector is based. From a client is received a homomorphically encrypted embedded query vector including a homomorphically encrypted result of an application of the mapping function to a query vector that includes one or more elements that are drawn from the finite ordered set, the embedded query vector having a lower dimensionality than the query vector. For each of the embedded server vectors, the server computes a homomorphic encryption of a result of an application of the processing function to the homomorphically encrypted embedded query vector and that embedded server vector. The server provides the encrypted results to the client. The server provides to the client through a performance of an oblivious transfer protocol one or more of the vectors identified of interest to the client based on the client's processing of the encrypted results.

The system and method allow application of any dimensionality-reducing function, including locality-sensitive embedding functions and histogram-based functions. The use of the dimensionality-reducing functions reduces ciphertext overhead, both for computing and communicating the ciphertext, by removing the need for extra encrypted domain computations needed to protect the privacy of the server's data. The overhead reduction is linearly dependent on the size of the server's database. Furthermore, the sharing of the mapping function parameters eliminates the need to perform the mapping in the encrypted domain as in Boufounos reference cited above. The elimination of this need reduces the number of ciphertext rounds and reduces the number of encryptions and decryptions that needs to be performed by the client, thus further reducing the computing overhead while preserving privacy of both parties.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
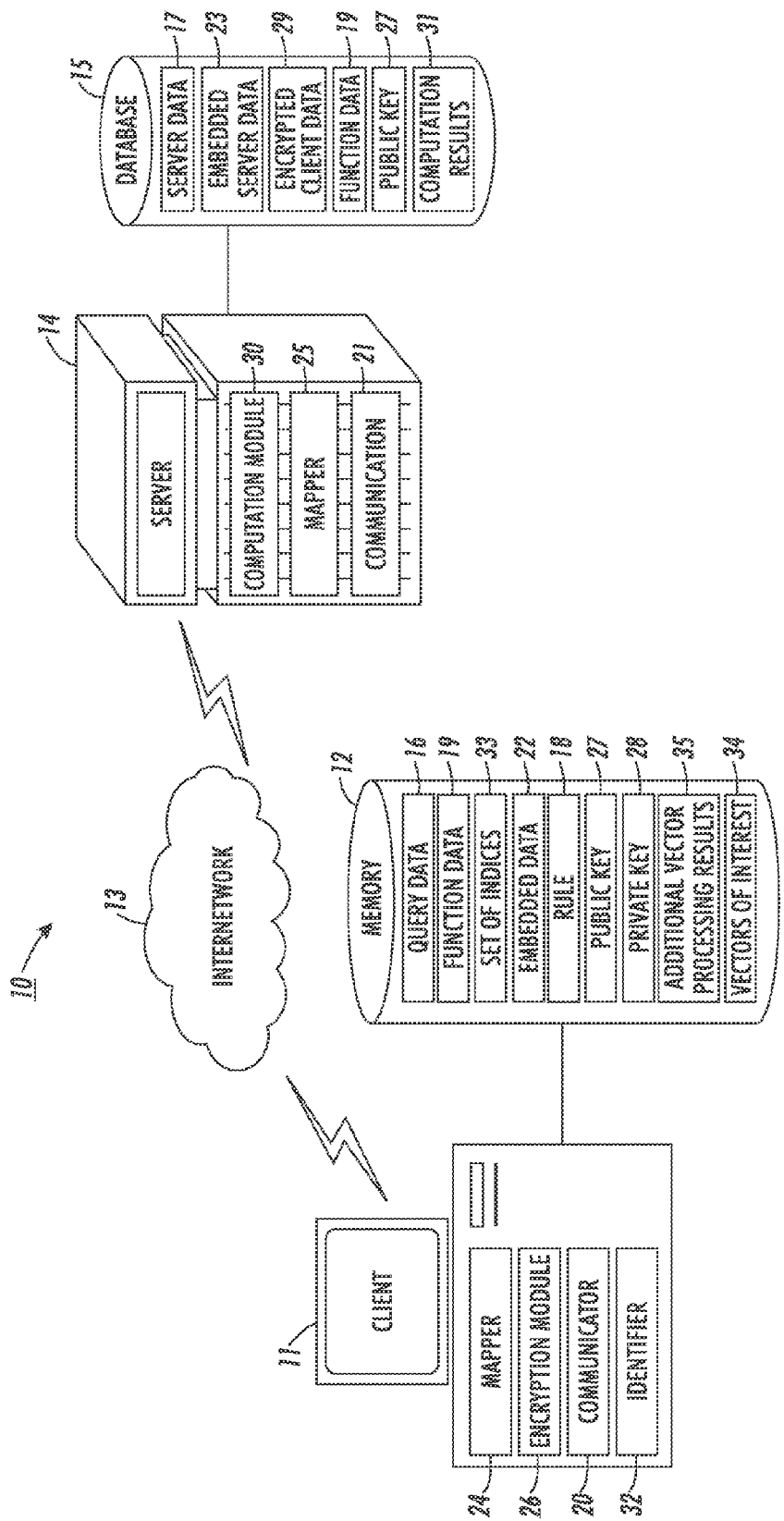
FIG. 1 is a block diagram showing a computer-implemented system for multi-party data function computing using discriminative dimensionality-reducing mappings, in accordance with one embodiment.

Computational overhead of multi-party data aggregate function computation can be reduced through use of dimensionality-reducing mapping functions whose parameters are shared between the parties. FIG. 1 is a block diagram showing a computer-implemented system 10 for multi-party data function computing using discriminative dimensionality-reducing mappings, in accordance with one embodiment. The parties includes at least one client 11 interconnected to a memory 12, with the client 11 being interconnected to a server 14 over a network 13, which can be an internetwork, such as the Internet or a cellular network, or an intranetwork. The server 14 is in turn interconnected to a database 15. While the client is shown as a desktop computer with reference to FIG. 1, the client can be any other computing device with a processor capable of executing computer-readable code, such as a laptop, a tablet, or a smartphone, though other kinds of devices are also possible. While the memory 12 is shown to be an external memory interconnected to the client 11 with reference to FIG. 1, such as an external database or another external storage, in a further embodiment, the memory 12 can be internal to the client 11. Also, while the server database 15 is shown to be a unitary database with reference to FIG. 1, in a further embodiment, the database may be in a horizontally partitioned format, with the partitions being split across multiple storage servers (not shown) instead of the server 14. In that embodiment, the components of the server 14 described below are present in each of the storage servers, with each of the storage servers communicating separately with the client 11 and performing the functions of the server 14 described below.

The memory 12 stores query data 16, data about which the client can make queries from the server 14 to find data 17 accessible to the server 14 that is of interest to the client 11, such as data 17 with a specific relationship to at least a portion of the query data 16. For example, at least a portion of the query data can be a vector $X_q$ ("query vector") composed of multiple elements and the server data 17 of interest data can be data with a specific relationship to the query vector. For example, the server data 17 of interest can be server vectors, each composed of one or more elements, and having a similarity to the query vector by being a nearest neighbor of the query vector or by having as many unique elements as the query vector. The elements of both the query vector and the server vectors are drawn from the same finite ordered set of elements. For example, the elements in the set can be integers, rational numbers, and approximations of real numbers, and the set can simultaneously include multiple kinds of elements. In a further embodiment, other kinds of elements in the set are possible. The set is called ordered because whether one element is greater than, equal to, or less than another element can be determined.

In a further embodiment, the query data 16 includes multiple data items each of which can be a vector with elements drawn from the same finite ordered set as query vector and the server vectors.

The server data 17 can include one or more vectors with elements drawn from the finite ordered set, which are denoted by Yi, where i takes integer values from 1 to N, where N is the number of data items in the server data 17.

In a further embodiment, the query data 16 and the server data 17 can be floating point vectors, which can undergo formatting and be quantized into integer vectors prior to undergoing further processing described below. Likewise, the query data 16 and the server data 17 can be strings of characters, which are converted into ASCII integer formats and represented as integer vectors prior to undergoing processing described below.

The relationship between the server data 17 and the query data 16 can be defined in multiple ways, with the definition being provided by a rule 18 stored in the memory 12. For example, the relationship can be the query integer vector and the integer vector stored as the server data 17 being nearest neighbors, with the distance threshold between the vectors necessary for them to count as nearest neighbors being specified by the rule 18. Similarly, the relationship specified by the rule 18 can be the number of unique elements in the integer vectors—thus, integer vectors in the server data 17 can be only of interest to the client 11 if the server integer vectors have at least as many unique values as are present in the query integer vector.

To determine whether the relationship between the query integer vector and the server integer vectors satisfies the rule 18 without compromising the privacy of either the client 11 or the server 14, data 19 about multiple functions is necessary by the client 11 and the servers 14. The data 19 about these functions is shared between the client 11 and the server 14 as described in detail below with reference to FIG. 3 and can allow the client 11 and the server 14 to apply the functions. The data 19 can include parameters for applying the functions, such as values to be used in calculating the function f (function ƒ described below) distance thresholds to be satisfied by the nearest neighbors, data about a matrix used during application of the function h ( ), and the values assumed by embedded vector elements after being created based on the histogram, as described below; other parameters and kinds of parameters are also possible One of the functions about which the data 19 is stored is a discriminative dimensionality-reducing function that is denoted as h( ). The term dimensionality refers to the number of dimensions in which the vector is present—the number of elements, values, making up the vector. Thus, a vector obtained as a result of applying the function h( ) have a lower dimensionality, lower number of elements than the vector that is input into the function. The output vector can be referred to as "embedded vector." For the purposes of this application, the terms "embedding" and "mapping" are used interchangeably. The function h( ) is called discriminative because the outputs of the embedded vectors retain a specific relationship that the input vectors had to each other, allowing to distinguish between output vectors based on input vectors with the specific relationships to each other defined by the rule 18 and input vectors that do not have such relationship to each other.

In one embodiment, where the vectors of interest are integer vectors that are nearest neighbors of the query integer vector, the function h ( ) can be a locality-sensitive embedding function. A locality-sensitive embedding is a kind of a nearest neighbor embedding.

A nearest neighbor embedding is a mapping of an input vector into an output vector such that the pairwise distances between output vectors have a specific relationship with the pairwise distance between the corresponding input vectors. For example, A Johnson-Lindenstrauss ("JL") mapping, described in detailed in Achlioptas, Dimitris, "Database-friendly random projections: Johnson-Lindenstrauss with binary coins." *Journal of computer and System Sciences* 66.4 (2003): 671-687, the disclosure of which is incorporated by reference, is an example of such an embedding. Under the JL mapping, an input vector is multiplied by a matrix with randomly distributed entries to obtain an output vector. Under this mapping, the pairwise squared Euclidean distances between any two output vectors are approximately equal to the pairwise squared Euclidean distances between the corresponding two input vectors. In this mapping, the long input vectors are mapped into shorter output vectors, (informally referred to as "hashes"), where similarity amongst the hashes is indicative of closeness amongst the input vectors.

Unlike other kinds of nearest neighbor embeddings, in a locality sensitive embedding the distance relationship changes depending upon whether the distances between the vectors are above or below a threshold. One example of a locality sensitive embedding is Locality Sensitive Hashing (LSH), described in detail in Datar, M., Immorlica, N., Indyk, P., & Mirrokni, V. S. "Locality-sensitive hashing scheme based on p-stable distributions," *Proceedings of the twentieth annual symposium on Computational geometry* (pp. 253-262), (2004, June), ACM, the disclosure of which is incorporated by reference. Under this mapping, if two input vectors X and Y are within a certain distance dT, then the corresponding output vectors x and y are identical, with high probability. On the other hand, if two input vectors X and Y are greater than a certain distance c dT apart (where c is a positive constant), then two conditions are satisfied: (1) The corresponding output vectors x and y are unequal with high probability; and (2) The distance between x and y is independent of the distance between X and Y.

A second example of a locality sensitive embedding is a Universal Embedding ("UE"), described in detail in Boufounos, Petros, and Shantanu Rane, "Secure binary embeddings for privacy preserving nearest neighbors." *IEEE International Workshop on Information Forensics and Security (WIFS)*, 2011, the disclosure of which is incorporated by reference. This embedding is implemented by multiplying an input vector by a matrix containing random entries from a zero-mean Gaussian distribution, quantizing the elements of the output vector, and retaining only the least significant bit of the quantized result. Under this mapping, if the two input vectors X and Y are within a certain distance dT, then the distance between two output vectors x and y (normalized by the vector length) is proportional to the distance between the corresponding input vectors. If the two input vectors are greater than distance dT apart, then the distance between the two output vectors (normalized by the vector length) is approximately 0.5, independent of the distance between the underlying input vectors.

For locality-sensitive embeddings, distances between a pair of output vectors are informative of the input vectors being nearest neighbors if the distance between the output vectors is less than the threshold dT apart. Thus, in the case of LSH, a zero distance between output vectors x and y is informative, because the distance indicates that the corresponding input vectors are less than distance dT apart. Equivalently, non-zero (positive) distances are uninformative for the locality-sensitive mapping. Similarly, in the case of UE, normalized distances from 0 to 0.5–Δt, wherein Δt is a small (negligible compared to 0.5) scalar value, between output vectors x and y are informative because they indicate that the corresponding input vectors are less than the distance dT apart.

Other kinds of the locality-sensitive embedding functions are possible. Similarly, other kinds of the function h( ) besides the locality-sensitive embedding functions are possible. For example, when the server vectors of interest are those vectors that have at least the same number of unique elements as the query vector, the function h( ) can be function of the histogram of the server vectors $Y_i$ and the query vector $X_q$. The function h( ) can be used to compute a histogram based on each of an input vector, $X_q$ or one of the server vectors $Y_i$, and create an embedded vector based on the histogram, as further described below with reference to FIGS. 2 and 4.

The application of the mapping function h( ) can create embedded query data 22 and embedded server data 23. Both the client 11 and the server 14 execute mappers 24, 25 that apply the mapping function h( ) to the query vector stored as the query data 16 and the server vectors stored as part of the server data 17. The client mapper 24 applies the function h( ) to the query vector $X_q$ and obtains an embedded vector denoted as $x_q$; thus, $x_q=h(X_q)$. $x_q$ has a lower dimensionality than $X_q$. Similarly, the server mapper 25 applies h( ) to the vectors $Y_i$, creating the embedded vectors $y_i$; thus, $y_i=h(Yi)$ and has a lower dimensionality than $Y_i$. Each of the embedded vectors $y_i$ has the same index i as the server vector $Y_i$ on which that embedded vector is based. Thus multiple embedded vectors are created by the application of the function h( ), with one embedded vector $y_i$ created based on each vector $Y_i$. The embedded vector can be stored as part of the embedded query data 22 and the embedded vectors are stored as embedded server data 23. The mapper 24 can also apply the function h( ) to the additional vectors stored on the memory 12, denoted as $X_r$, to create additional embedded vectors denoted as $x_r$, which can be stored as part of the embedded query data 22.

Figure 2:
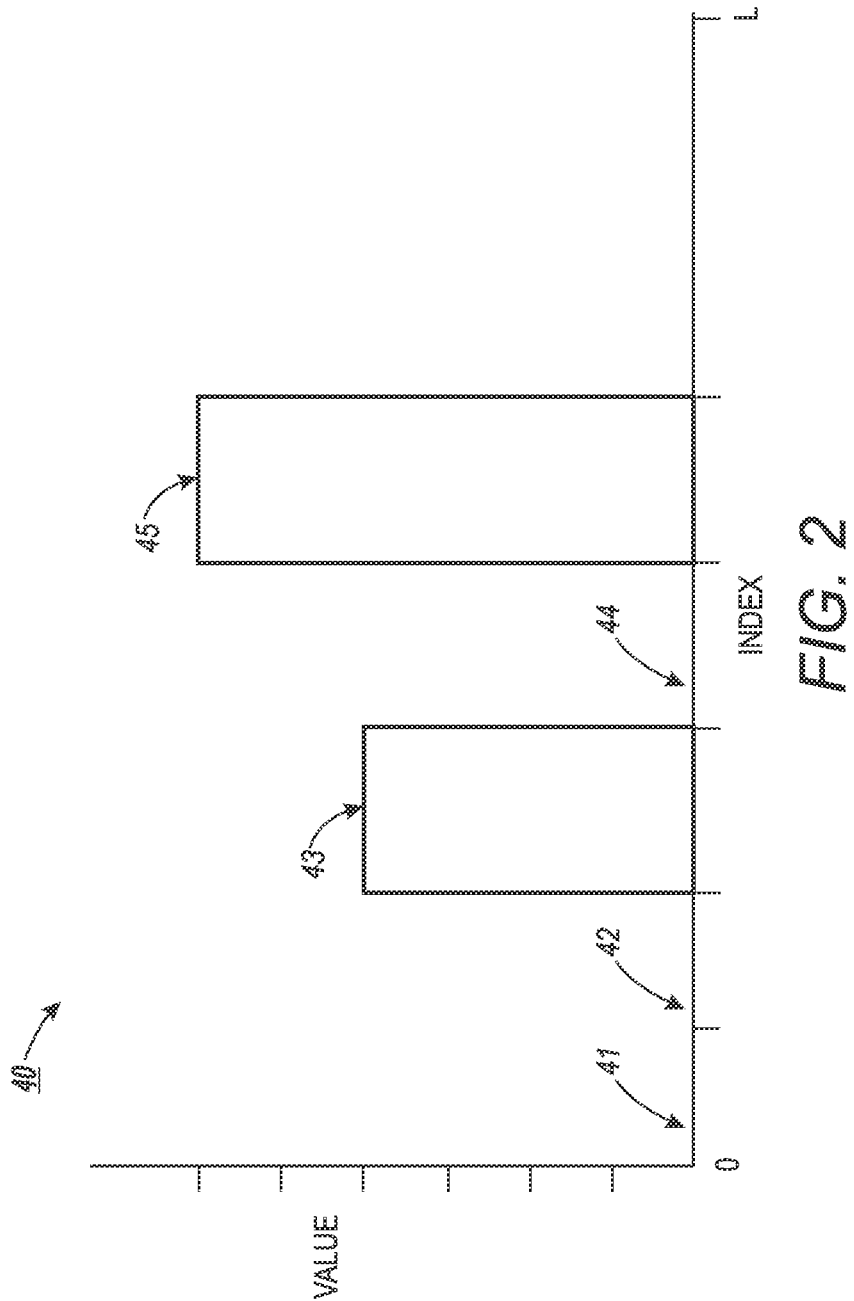
FIG. 2 is a diagram showing, by way of example, a histogram representing input vectors of the mapping function, in accordance with one embodiment.

As mentioned above, the function h( ) can be a function of the histogram of the server vectors $Y_i$ and the query vector $X_q$. When the function h( ) is initially applied by the mappers 24, 25 to the query vector $X_q$ and server vectors $Y_i$ respectively as input vectors, the application of the function h( ) first creates a histogram representing the values of individual elements of each of the input vectors. FIG. 2 is a diagram 40 showing, by way of example, a histogram representing input vectors of the mapping function, in accordance with one embodiment. Each of the bins of the histogram shows the number of occurrences (shown on the y-axis) of the elements of the input vector, $X_q$ or $Y_i$ that fall inside a pre-defined bin. The x-axis of the diagram shows an index of the bins of the histogram, with the histogram having an L number of bins (and thus the maximum index is L). The unpopulated bins (bins with value of zero), such as those shown identified as bins 41, 42, 44 and the populated bins, such as bins 43, 45, are shown only for illustrative purposes and other numbers of populated and unpopulated bins are possible, as well as other values of populated bins are possible. After creating the histogram for the input vectors, the mappers 24, 25 create the embedded vectors based on the histograms. Thus, the mapper 24 creates the embedded vector $x_q$ that has L elements based on the histogram representing the query vector $X_q$. As the number of elements in the vector $x_q$ equals the number of the number of the bins in the histogram representing $X_q$, each element of $x_q$ corresponds to one of the bins of the histogram and can be identified by the same index as the bin, denoted as k, which ranges from 1 to L. The vector $x_q$ is constructed in a way that $x_q(k)=1$ if the histogram bin with the same index is populated (has a value more than zero), such as in the bins 43, 45, and $x_q(k)=0$ if the corresponding bin is unpopulated (has a value of zero).

The mapper 25 also creates the embedded vectors $y_i$ based on the histograms representing the server vectors $Y_i$. Thus, each of the embedded vectors $y_i$ is based on the histogram representing one of the server vectors $Y_i$. Each embedded vector $y_i$ has L elements, with an index k of each element corresponding to one of the bins of the histogram, indices ranging from 1 to L. Each embedded vector $y_i$ is constructed so that $y_i(k)=0$ if the corresponding bin is populated and $y_i(k)$ takes a uniformly random value in the interval [a, b] if the bin is unpopulated. The values of a and b are chosen so that the mean value 0.5 (a+b) is away from 0

Returning to FIG. 1, data 19 about other functions besides h( ) is also stored. For example, function $f(X_q, Y_i)$ function is any aggregate function that uses $X_q$ and one of the server vectors $Y_i$ as inputs. In the nearest neighbor example described above, the application of the function f can calculate a squared Euclidian distance between the query vector and one of the server vectors $Y_i$. The function f can be other kinds of functions as well. For example, in the case described above where the server vectors of interest are those vectors that have at least the same number of unique elements as the query vector, the function f is a f(X,Y)=0 if the number of unique elements in Y equals or exceeds that in X, and f(X,Y)=1 if the number of the unique elements is smaller than in the query vector. Other kinds of function f are possible.

Finally, data 19 is also stored regarding the function g, which is an embedded vector processing function and is used for processing of the embedded query vector $x_q$ and the embedded server vectors $y_i$. In the nearest neighbor example described above, the function g is the distance function that calculates a squared Euclidian distance between the embedded query vector $x_q$ and one of the server vectors $y_i$. In the example above where the server vectors of interest are those vectors that have at least the same number of elements as the query vector, the function g calculates a dot product of the vectors $x_q$ and one of the vectors $y_i$. Other definitions of function g are possible.

Summarizing the functions described above, the embedding function h( ) is chosen such that $g(x_q, y_i) \approx f(X_q, Y_i)$ whenever $f(X_q, Y_i)$ obeys the rule 18, and $g(x_q, y_i)$ is independent of $f(X_q, Y_i)$ whenever $f(X_q, Y_i)$ does not obey the rule 18. Thus, in the nearest neighbor example with locality-sensitive hashing (LSH), the function h( ) is chosen such that the distance $g(x_q, y_i)=0$ whenever $f(X_q, Y_i)$ is less than a threshold value dT, and g(xq, yi) takes a value independent of $f(X_q, Y_i)$ whenever $f(X_q, Y_i) > c$ dT, where c is a constant that depends on the parameters of the locality-sensitive hash functions employed. Thus, for example, if the threshold dT equals 5, a value of $f(X_q, Y_i)$ less than 5 satisfies the rule 18 which is that $f(X_q, Y_i)<dT$, meaning that $g(x_q, y_i)=0$. Similarly, in the example where the server vectors of interest are those vectors that have at least the same number of unique elements as the query vector, $g(x_q, y_i)=0$ when the value of $Y_i$ is such that $f(X_q, Y_i)=0$.

Figure 3:
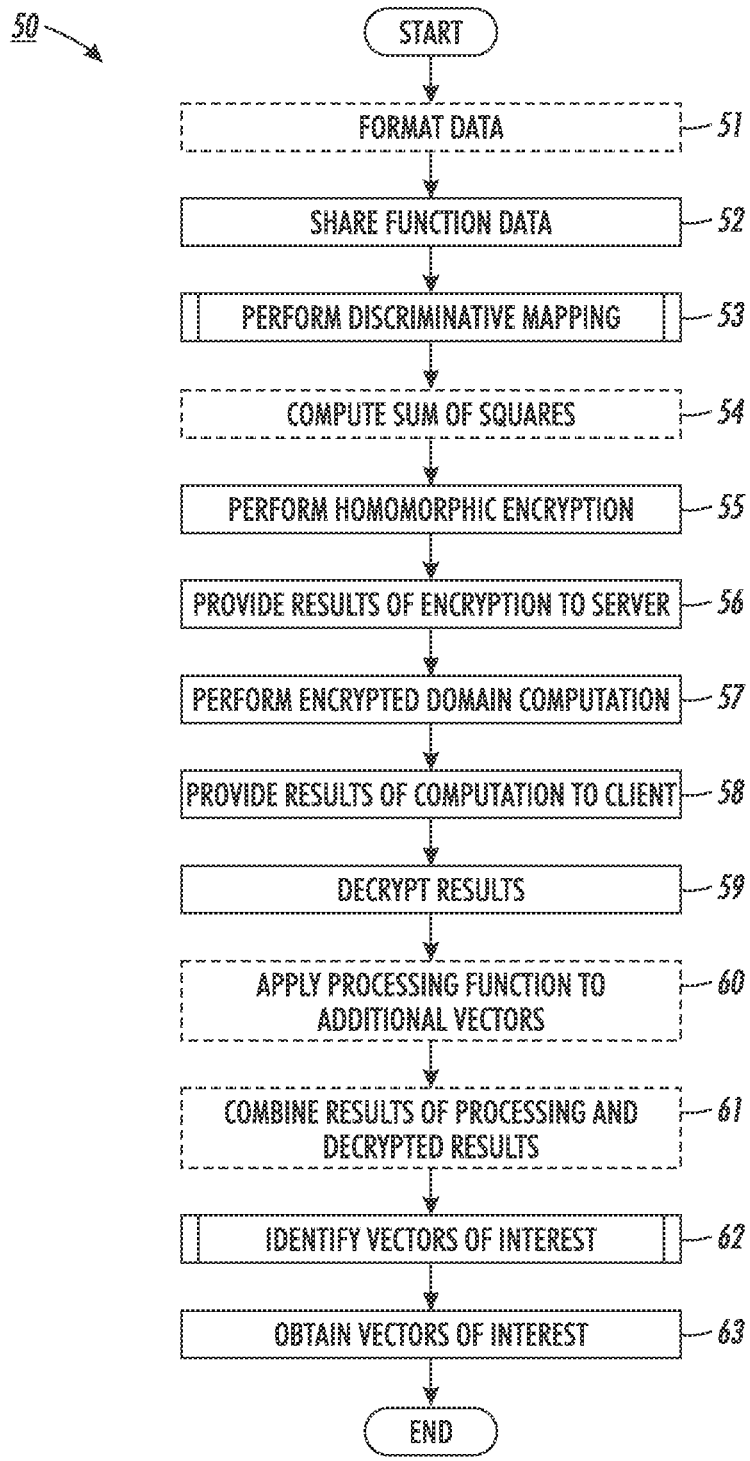
FIG. 3 is a flow diagram showing a computer-implemented method for multi-party data function computing using discriminative dimensionality-reducing mappings, in accordance with one embodiment.

The data 19 regarding the functions g( ) and h( ) must be shared by both the client 11 and the server 14, as also described below with reference to FIG. 3. In one embodiment, the data regarding the functions is initially stored in the memory 12 of the client 11. The client 11 executes a communicator 20, which shares at least a portion of the function data 19 with the server 14 over the network 13, which the server 14 stores at the database 15. In a further embodiment, at least a portion of the function data 19 can be also stored by the server 19 and provided to the client 11 by a communicator 21 executed by the server 14. Regardless of the initial storage of the functions, the parameters for the processing function and the mapping function are shared by the communicators 20, 21 between the client 11 and the server 14.

The client 11 also executes an encryption module 26, which applies a homomorphic encryption, denoted as E, to each element of the embedded query vector, creating a homomormphically encrypted embedded query vector, which can be denoted as E $(x_q)$. The encryption can be a fully homomorphic encryption, such as described in detail by Gentry, Craig. "Fully homomorphic encryption using ideal lattices." *STOC*. Vol. 9. 2009, or an additively homomorphic encryption scheme, such as described in Paillier, Pascal. "Public-key cryptosystems based on composite degree residuosity classes." *Advances in cryptology—EUROCRYPT'99*. Springer Berlin Heidelberg, 1999, the disclosures of which are incorporated by reference. If the additively homomorphic encryption is employed, the encryption module 26 also computes an encrypted sum of squares of all elements of the embedded query vector $x_q$. The client's memory 12 stores both the public key 27, which allows to perform the encryption, and the private key 28, which allows to decrypt the encryption, while only the public key 27 is accessible to the server 14, being stored in the database 15. The public key 27 can be provided to the server 14 by the client 11. The encrypted query vector and, if calculated, the encrypted sum of squares, is provided by the communicator 20 over the network 13 to the server 14 and is stored in the database 15 as client data 29.

Upon receiving the encrypted vector, the server 14 executes a computation module 30, which performs encrypted domain computations, using the homomorphic properties of the cryptosystem to compute an encrypted result of g $(x_q, y_i)$, applications of the processing function that uses as inputs the encrypted query vector and each of the embedded vectors $y_i$, as further described with reference to FIG. 3; the encrypted result can be denoted as E $(g(x_q, y_i)$. The encrypted sum of squares can also be used in the computation if the homomorphic encryption scheme is only additively homomorphic. The encrypted value resulting from the computation, and the index i in plaintext of the embedded vector (and correspondingly of the server vector $Y_i$ on which that embedded vector $y_i$ is based) used in the computation can be stored as computation results 31 in the database 15 and are sent over the network 13 by the server communicator 21 to the communicator 20 of the client 11. The encryption module 26 decrypts the results 30 using the private key 28, and based on the indices provided with the results, an identifier 32 executed by the client 11 identifies indices of the server vectors that are of interest, as further described below with reference to FIGS. 3 and 5. The identifier 32 creates a set of these indices 32. The client communicator 20 engages with the server communicator 21 in an oblivious transfer protocol, a protocol, such as described in Rabin, Michael O. "How To Exchange Secrets with Oblivious Transfer." *IACR Cryptology ePrint Archive* 2005 (2005): 187, the disclosure of which is incorporated by reference, during which the server 14 provides the client 11 with the vectors of interest whose indices are included in the set while the server 14 remains oblivious to the identity of the provided vectors. Other variants of the oblivious transfer protocol can also be used. As a result, the privacy of both parties is protected, with the client 11 finding out only indices of the server vectors and obtaining only vectors of interest and the server 14 not finding out the server vectors that are of interest to the client 11.

Figure 5:
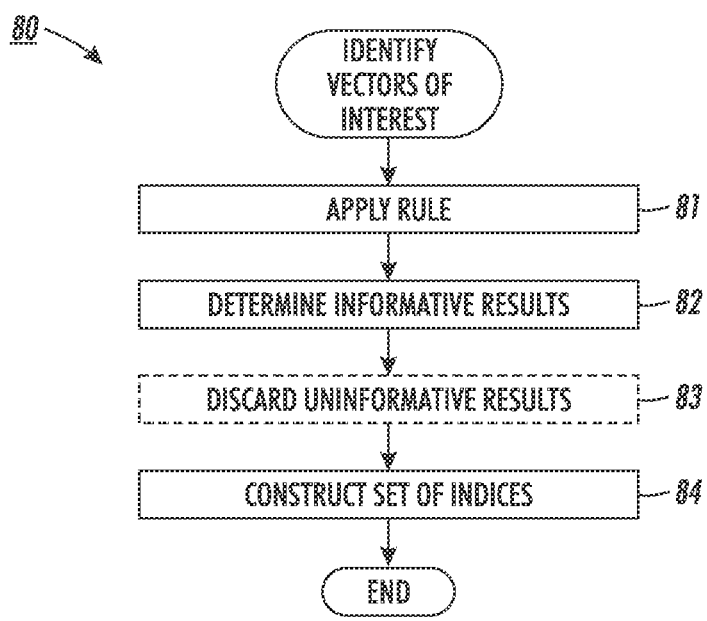
FIG. 5 is a flow diagram showing a routine for identifying the vectors of interest for use in the method of FIG. 3, in accordance with one embodiment.

The identifier 32 can also apply the processing function g to the additional embedded vectors $x_r$, and combine the results of the application with the decrypted server computation results 31, identifying the additional vectors that are of interest and are stored locally on the memory 12, as further described with reference to FIGS. 3 and 5.

The client 11 and server 14 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the computations and communication described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. For example, the client 11 and the server 14 can include other components conventionally found in programmable computing devices, such as input/output ports, network interfaces, and non-volatile storage, although other components are possible. Also, while the parties in the system 10 are referred to as the client 11 and the server 14, any other names can be applied to the computing device with the components and functions described above for the client 11 and the server 14.

Sharing parameters for performing discriminative low-dimensionality mappings and having both a client and a server perform the mappings in plain text simplifies the multi-party data exchange, reducing the computational overhead. FIG. 3 is a flow diagram showing a computer-implemented method 50 for multi-party data function computing using discriminative dimensionality-reducing mappings, in accordance with one embodiment. The method 50 can be implemented using the system 10 described above with reference to FIG. 1, though other ways to implement the method 50 are possible.

Optionally, if the data stored on a client or a server is not in an integer vector format and instead is in other formats, such as floating point vectors or in character string formats. For example, the data is formatted by converting the data into integer vectors (step 51). The server and the client share data (step 52), such as parameters for function implementation, regarding the functions g, embedded vector processing function, and the function h( ), the discriminative low-dimensionality mapping function, described above with reference to FIGS. 1 and 2. Other function data, such as for the aggregate function f can also be shared. In one embodiment, the data is initially stored on the client and the client sends the data to the server over a network. In a further embodiment, the client can also provide the public key for the encryption scheme that the server can use as described below. Other ways for the client and the server to share the data are possible.

Once both the client and the server are in possession of the function data, discriminative mapping is performed by both the client and the server, with the client applying the mapping function h( ) to the query vector $X_q$, obtaining an embedded query vector $x_q$, and the server applies the mapping function h( ) to the vectors $Y_i$ maintained in a database by the server, obtaining one embedded vector $y_i$ for each server vector $Y_i$ (step 53). If the server vectors of interest are nearest neighbors of the query integer vector $X_q$, the function h( ) is a locality-sensitive embedding function. If vectors of interest have at least as many unique elements as the query vector $X_q$, the function h( ) is a histogram-dependent function, with the mapping proceeding as further described as with reference to FIG. 4. Also, if the memory of the client stores additional vectors, the function h( ) is also applied to the additional vectors to create additional embedded vectors held by the client's memory. Thus, for each additional vector denoted as $X_r$, where r is an index of the vector, an additional embedded vector denoted as $x_r$ is created. Other kinds of the function h( ) are possible.

Once the embedded vector is obtained, the client optionally computes sum of squares of all elements of the embedded query vector $x_q$ (step 54). The sum can be denoted as $S_q$. The computation needs to be performed only if the embedded query vector $x_q$ is subsequently encrypted using additively homomorphic encryption.

The embedded query vector $x_q$, and, if computed, the sum of the squares are encrypted using either the fully homomorphic encryption or the additively homomorphic encryption scheme (step 55). For the embodiment in which the desired server vectors are nearest neighbors of the query vector $X_q$, the additively homomorphic encryption scheme is applied. For the embodiment in which the histograms of the client's query data and the server's data are examined for the number of unique elements, either additively or fully homomorphic encryption can be used. The encrypted embedded query vector can be denoted as E ($x_q$) and the encrypted sum of squares can be denoted as E ($S_q$). The results of the encryption are sent to the server over the network (step 56).

The server performs encrypted domain computations on the received encrypted results, using the homomorphic properties of the cryptosystem to compute encryptions of g ($x_q$, $y_i$) for all $y_i$, results of application of the processing function g that uses as input a pair that includes the embedded query vector $x_q$ and each of the embedded vectors $y_i$ (step 57). Homomorphic cryptosystems can be used to compute distance functions that can be represented as polynomial expressions. The polynomial function of the vector $x_q$ and an vector $y_i$, can be computed in the encrypted domain, using a fully homomorphic encryption scheme. Furthermore, if the polynomial expression involves only a single multiplication among an element $x_q$k of $x_q$ and a corresponding element $y_i$ k of $y_i$, then the distance function can also be computed in the encrypted domain by an additively homomorphic cryptosystem. Accordingly, if the vectors of interest are the nearest neighbors of the embedded query vector $x_q$, the encrypted domain computation can involve calculating an encryption of squared distances between $x_q$ and each of the $y_i$ denoted by $E(d_i)=E(Sum_k (x_q(k)-y_i(k))^2)$, of the embedded query vector $x_q$ from each of the embedded server vectors $y_i$. The encrypted sum of squares is used in this calculation. The letter k identifies an index of each element of the embedded query vector $x_q$ and an element of one of the embedded vectors $y_i$ and runs from 1 to L, which is the length of the vectors $x_q$ and $y_i$. In the computation, the results of $(x_q(k)-y_i(k))^2$ for all values of k are summed together to determine the distance. The letter i, as above, denotes the index of the server vector which is used in the computation. In a further embodiment, other distance functions can be used as long as they can be expressed as polymomials.

In the embodiment where the vectors $Y_i$ of interest have at least as many unique elements as the query vector $X_q$, as mentioned above, the result of computing g ($x_q$, $y_i$) is the dot product of the vectors $x_q$ and each $y_i$, and the encrypted domain computation involves computing $E(d_i)=E(Sum_k x_q(k)*y_i(k))$, for i=1, 2, . . . , N. As above, for a computation for $x_q$ and one vector $y_i$, a sum of all dot products for all values of k is computed, with k being as in the paragraph above.

Other ways to perform the encrypted domain computations are possible.

The results of the encrypted domain computation and plaintext indices of the embedded server vectors (corresponding to the indices of the server vectors on which the embedded vectors are based) used to obtained each of the results are transmitted to the client over the network (step 58). The client decrypts the results using the private encryption key (step 59), obtaining values resulting from the applications of the function g. Thus, in the nearest neighbor example, the results obtained by the client include N distance values, the values being between $x_q$ and each of the N server vectors $y_i$. Similarly, in the embodiment where the vector of interest $Y_i$ have at least as many unique elements as the query vector $X_q$, the results obtained by the client include N dot product values. Thus, the client obtains the value in the result and the index i of the embedded server vector $y_i$ used to obtain that result.

Optionally, if additional embedded vectors are created and the vectors of interest are nearest neighbors for the query vector, the client can calculate g ($x_q$, $x_r$) (step 60). Thus, for each of the additional embedded vectors, the client calculates the result of the processing function g to that embedded query vector $x_q$ and the additional embedded vector, with g being a distance function. In a further embodiment, this step can be performed at a different point of the method. If calculated, the results of the processing of the additional embedded vectors can be optionally combined with the decrypted results received from the server (step 61).

The decrypted results received from the server and, if computed, the additional embedded vectors encrypted results, are analyzed to identify vectors of interest as further described below with reference to FIG. 5 (step 62). The indices of the server vectors of interest are obtained. As described more fully below with reference to FIG. 5, when the results obtained by the server are decrypted and classified into informative and uninformative values, the client can identify the indices of the server's vectors that are of interest. The client then obtains the server's vectors corresponding to these indices by performing oblivious transfer protocol with the server, as described above, with the server not finding out the identity of the provided vectors (step 63), terminating the method 50.

While the method 50 is described with reference to a single server maintaining the server vectors at a single database, in a further embodiment, multiple servers maintaining different partitions of a partitioned database can be performing the steps of the method described above, with the client interacting with each of the plurality of the servers.

While the method 50 is described with reference to query vectors and server vectors that are vectors, the method 50 can be performed on server vectors and query vector that include other kinds of elements of the finite ordered set, such as vectors that include rational numbers and approximations of real numbers, as described above.

Figure 4:
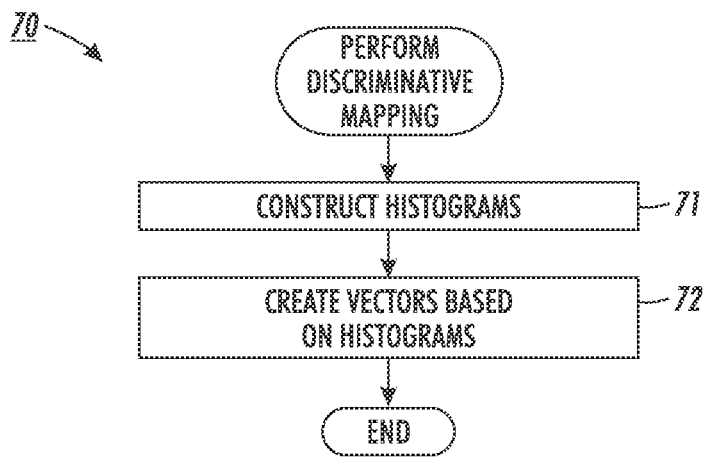
FIG. 4 is a flow diagram showing a routine for performing discriminative mappings using histograms for use in the method of FIG. 3, in accordance with one embodiment.

Representing a vector as a histogram and then converting the histogram to an embedded vector provides a way for performing discriminative dimensionality-reducing mappings that creates results that can be processed by functions other than distance functions. FIG. 4 is a flow diagram showing a routine 70 for performing discriminative mappings using histograms for use in the method 50 of FIG. 3, in accordance with one embodiment. Initially, a histogram is constructed by the client server based on the query vector $X_q$, and a histogram is constructed by the server for each of the vectors $Y_i$ maintained by the server on a database as described above with reference to FIG. 2 (step 71). An embedded vector is created based on each of the histograms, with the client creating the embedded query vector $x_q$ and the server creating each of the embedded vectors $y_i$ as described above with reference to FIG. 2 (step 72), terminating the routine 70.

Identifying results of processing function computation as informative and not informative allows to identify vectors of interest to the client. FIG. 5 is a flow diagram showing a routine 80 for identifying the vectors of interest for use in the method 50 of FIG. 3. As mentioned above, after decrypting the results received from the server, the client has the values of $g(x_q, y_1), g(x_q, y_2), \ldots, g(x_q, y_N)$, and optionally, values of results of the $g(xq, x_r)$ computations for all additional embedded vectors. The client also has the index associated with the embedded server vector that was used to obtain each result. A rule that defines the relationship between the client and the vectors of interest is applied to each of the results (step 81). For example, in the nearest neighbor example, the rule defines a permissible distance between nearest neighbors and that distance is compared to the value of the distance of each of the results. Similarly, if the vectors of interest are those vectors that have at least as many unique elements as the query vector, the rule specifies that the dot product calculated by the application of the function g needs to have a value of 0. Informative results, those results that satisfy the applied rule, are identified (step 82). The results are informative of the relationship between the $Y_i$ and Xq (or $X_r$) on which the informative result is based being of interest to the client. The uninformative results, those results that do not satisfy the rule, can be discarded (step 83). A set of indices of the embedded server vectors $y_i$ used to compute the informative results is constructed by the client (step 84), terminating the routine 80. As mentioned above, the index of the embedded vector $y_i$ is the same as the index of the server vector $Y_i$ on which that embedded vector is based and therefore the set of indices lists the indices of the server vectors $Y_i$ that are of interest to the client. The set of the indices is used during the oblivious transfer protocol described above, allowing the client to request only those of the server vectors $Y_i$ that are of interest to the client and without learning anything about the other vectors. As the vectors $X_r$ are already accessible to the client, the client does not need to further retrieve these vectors.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for multi-party data function computing using discriminative dimensionality-reducing mappings, comprising:
   a server comprising a processor configured to execute computer code, comprising:
      a maintenance module configured to maintain one or more vectors, each of the vectors comprising one or more elements drawn from a finite ordered set;
      a function module configured to obtain by the server one or more parameters for a discriminative dimensionality-reducing mapping function and for an embedded vector processing function;
      a mapping module configured to create by the server embedded server vectors by applying the mapping function to the server vectors, wherein each of the embedded server vectors has a lower dimensionality than the server vector on which that embedded server vector is based;
      a receipt module configured to receive from a client a homomorphically encrypted embedded query vector comprising a homomorphically encrypted result of an application of the mapping function to a query vector comprising one or more elements drawn from the finite ordered set, the embedded query vector having a lower dimensionality than the query vector;
      a computation module configured to, for each of the embedded server vectors, compute by the server a homomorphic encryption of a result of an application of the processing function to the homomorphically encrypted embedded query vector and that embedded server vector;
      a result module configured to provide by the server the encrypted results to the client, wherein each of the server vectors is associated with an index and the server provides to the client with each of the encrypted results the index of the server vector on which the embedded server vector used to obtain that result is based; and
      a transfer module configured to provide to the client by the server through a performance of an oblivious transfer protocol one or more of the server vectors identified of interest to the client based on the client's processing of the encrypted results; and
   the client comprising another processor configured to execute code, comprising:
      a processing module configured to process the encrypted results received from the server by the client, comprising:
         a decryption module configured to decrypt the encrypted results;
         an identification module configured to identify those of the results informative of a relationship between the query vector and one of the server vectors; and a construction module configured to, based on the informative results, construct a set of the indices associated with the server vectors of interest to the client; and a retrieval module configured to retrieve the server vectors corresponding to the set of indices using the oblivious transfer protocol, wherein the retrieved server vectors are the server vectors of interest.

2. A system according to claim 1, wherein the server vectors of interest are nearest neighbors of the query vector.

3. A system according to claim 1, wherein the server vectors of interest comprise at least as many unique elements as the query vector.

4. A system according to claim 1, wherein one of the results is informative if the application of the processing function to the embedded query vector and the embedded server vector used to obtain the result obeys a predefined rule, wherein the predefined rule relates an aggregate function of a pair comprising the embedded query vector and the embedded server vector to a function of another pair comprising the query vector and the server vector on which that embedded server vector in the pair is based.

5. A system according to claim 4, wherein the processing function and the aggregate function are distance functions and the rule specifies a distance between nearest neighbors query vector and one of the server vectors.

6. A system according to claim 1, further comprising:
a histogram module comprised in the server and configured to, for each of the server vectors, create a histogram representing that server vector and create one of the embedded server vectors based on the histogram, wherein each element of the embedded server vector is associated with one of the bins of the histogram, wherein the elements of the embedded server vector have a value of 0 if the associated bins are populated and the elements have a random value in an interval [a, b] if the corresponding bins are unpopulated, wherein a and b are chosen so that a mean value 0.5 (a+b) is away from 0.

7. A system according to claim 1, further comprising:
a histogram module comprised in the client and configured to create a histogram representing the query vector and create the embedded query vector based on the histogram, wherein each element of the embedded query vector associated with one of the bins of the histogram, wherein the elements of the embedded query vector have a value of 1 if the associated bins are populated and the elements have a value of 0 if the bins are unpopulated.

8. A system according to claim 1, further comprising:
an additional vector module comprised in the client and configured to maintaining by the client additional vectors and creating additional embedded vectors by applying the mapping function to the additional vectors;

an additional mapping module comprised in the client and configured to, for each of the embedded vectors, apply by the client the processing function to the embedded query vector and that additional embedded vector;

a combining module comprised in the client and configured to combine the result of the processing function application with the result of decrypting the computations performed by the server; and an identification module comprised in the client and configured to identify any of the additional vectors that are nearest neighbors of the query vector based on the combined results.

9. A system according to claim 1, wherein the encryption is an additively homomorphic encryption, further comprising:
a sum module comprised in the server and configured to receive by the server an encrypted sum of squares of all elements of the embedded query vector and using the sum in an encrypted-domain computation of polynomial functions used to compute the results of the processing function application.

10. A computer-implemented method for multi-party data function computing using discriminative dimensionality-reducing mappings, comprising:

maintaining by a server one or more vectors, each of the vectors comprising one or more elements drawn from a finite ordered set;

obtaining by the server one or more parameters for a discriminative dimensionality-reducing mapping function and for an embedded vector processing function;

creating by the server embedded server vectors by applying the mapping function to the server vectors, wherein each of the embedded server vectors has a lower dimensionality than the server vector on which that embedded server vector is based;

receiving from a client a homomorphically encrypted embedded query vector comprising a homomorphically encrypted result of an application of the mapping function to a query vector comprising one or more elements drawn from the finite ordered set, the embedded query vector having a lower dimensionality than the query vector;

for each of the embedded server vectors, computing by the server a homomorphic encryption of a result of an application of the processing function to the homomorphically encrypted embedded query vector and that embedded server vector;

providing by the server the encrypted results to the client, wherein each of the server vectors is associated with an index and the server provides to the client with each of the encrypted results the index of the server vector on which the embedded server vector used to obtain that result is based;

providing to the client by the server through a performance of an oblivious transfer protocol one or more of the server vectors identified of interest to the client based on the client's processing of the encrypted results; and processing the encrypted results received from the server by the client, comprising:
decrypting the encrypted results;
identifying those of the results informative of a relationship between the query vector and one of the server vectors; and
based on the informative results, constructing a set of the indices associated with the server vectors of interest to the client; and
retrieving the server vectors corresponding to the set of indices using the oblivious transfer protocol, wherein the retrieved server vectors are the server vectors of interest.

11. A method according to claim 10, wherein the server vectors of interest are nearest neighbors of the query vector.

12. A method according to claim 10, wherein the server vectors of interest comprise at least as many unique elements as the query vector.

13. A method according to claim 10, wherein one of the results is informative if the application of the processing function to the embedded query vector and the embedded server vector used to obtain the result obeys a predefined rule, wherein the predefined rule relates an aggregate function of a pair comprising the embedded query vector and the embedded server vector to a function of another pair comprising the query vector and the server vector on which that embedded server vector in the pair is based.

14. A method according to claim 13, wherein the processing function and the aggregate function are distance functions and the rule specifies a distance between nearest neighbors query vector and one of the server vectors.

15. A method according to claim 10, further comprising:
for each of the server vectors, creating by the server a histogram representing that server vector and creating one of the embedded server vectors based on the histogram, wherein each element of the embedded server vector is associated with one of the bins of the histogram, wherein the elements of the embedded server vector have a value of 0 if the associated bins are populated and the elements have a random value in an interval [a, b] if the corresponding bins are unpopulated, wherein a and b are chosen so that a mean value 0.5 (a+b) is away from 0.

16. A method according to claim 10, further comprising:
creating by the client a histogram representing the query vector and creating the embedded query vector based on the histogram, wherein each element of the embedded query vector associated with one of the bins of the histogram, wherein the elements of the embedded query vector have a value of 1 if the associated bins are populated and the elements have a value of 0 if the bins are unpopulated.

17. A method according to claim 10, further comprising:
maintaining by the client additional vectors and creating additional embedded vectors by applying the mapping function to the additional vectors;
for each of the embedded vectors, applying by the client the processing function to the embedded query vector and that additional embedded vector;
combining the result of the processing function application with the result of decrypting the computations performed by the server; and
identifying any of the additional vectors that are nearest neighbors of the query vector based on the combined results.

18. A method according to claim 10, wherein the encryption is an additively homomorphic encryption, further comprising:
receiving by the server an encrypted sum of squares of all elements of the embedded query vector and using the sum in an encrypted-domain computation of polynomial functions used to compute the results of the processing function application.

* * * * *